(12) United States Patent
Tay et al.

(10) Patent No.: US 11,163,309 B2
(45) Date of Patent: Nov. 2, 2021

(54) METHOD FOR AUTONOMOUS NAVIGATION

(71) Applicant: Direct Current Capital LLC, Wilmington, DE (US)

(72) Inventors: Kah Seng Tay, Mountain View, CA (US); Joel Pazhayampallil, Mountain View, CA (US); Brody Huval, Mountain View, CA (US)

( * ) Notice: Subject to any disclaimer, the term of this patent is extended or adjusted under 35 U.S.C. 154(b) by 131 days.

(21) Appl. No.: 16/206,453

(22) Filed: Nov. 30, 2018

(65) Prior Publication Data

US 2019/0196481 A1 Jun. 27, 2019

Related U.S. Application Data

(60) Provisional application No. 62/592,791, filed on Nov. 30, 2017.

(51) Int. Cl.

| | |
|---|---|
| G05D 1/02 | (2020.01) |
| G01S 17/89 | (2020.01) |
| G05D 1/00 | (2006.01) |
| B60W 30/00 | (2006.01) |
| G01S 17/86 | (2020.01) |
| G01S 17/931 | (2020.01) |
| G01S 17/87 | (2020.01) |
| G01S 13/931 | (2020.01) |
| G01S 13/87 | (2006.01) |

(52) U.S. Cl.
CPC .......... *G05D 1/0214* (2013.01); *B60W 30/00* (2013.01); *G01S 17/86* (2020.01); *G01S 17/89* (2013.01); *G01S 17/931* (2020.01); *G05D 1/0088* (2013.01); *G05D 1/0246* (2013.01); *G05D 1/0289* (2013.01); *G01S 13/87* (2013.01); *G01S 13/931* (2013.01); *G01S 17/87* (2013.01); *G05D 2201/0213* (2013.01)

(58) Field of Classification Search
CPC .. G05D 1/0214; G05D 1/0088; G05D 1/0246; G05D 1/0289; G01S 17/931; G01S 17/86; G01S 17/89; B60W 30/00
USPC .......................................................... 701/26
See application file for complete search history.

(56) References Cited

U.S. PATENT DOCUMENTS

9,725,171 B1 * 8/2017 Carmack ............... B64C 39/024
10,663,977 B2 * 5/2020 Cheng .................. H04W 4/024
(Continued)

*Primary Examiner* — Yazan A Soofi
(74) *Attorney, Agent, or Firm* — Polsinelli PC (57) ABSTRACT

One variation of a method for autonomous navigation includes, at an autonomous vehicle: recording a first image via a first sensor and a second image via a second sensor during a scan cycle; calculating a first field of view of the first sensor and a second field of view of the second sensor during the scan cycle based on surfaces represented in the first and second images; characterizing a spatial redundancy between the first sensor and the second sensor based on an overlap of the first and second fields of view; in response to the spatial redundancy remaining below a threshold redundancy, disabling execution of a first navigational action—action informed by presence of external objects within a first region of a scene around the autonomous vehicle spanning the overlap—by the autonomous vehicle; and autonomously executing navigational actions, excluding the first navigational action, following the scan cycle.

20 Claims, 3 Drawing Sheets

(56) References Cited

U.S. PATENT DOCUMENTS

| | | | |
|---|---|---|---|
| 2010/0063672 A1* | 3/2010 | Anderson | G05D 1/0246 |
| | | | 701/29.2 |
| 2016/0229404 A1* | 8/2016 | Byun | G05D 1/0088 |
| 2016/0231746 A1* | 8/2016 | Hazelton | B60W 30/00 |
| 2017/0123429 A1* | 5/2017 | Levinson | G05D 1/0214 |
| 2017/0124476 A1 | 5/2017 | Levinson et al. | |
| 2017/0316333 A1 | 11/2017 | Levinson et al. | |
| 2018/0328745 A1 | 11/2018 | Nagy et al. | |
| 2019/0137287 A1 | 5/2019 | Pazhayampallil et al. | |
| 2019/0143967 A1 | 5/2019 | Kutila et al. | |
| 2019/0258251 A1* | 8/2019 | Ditty | G05D 1/0274 |
| 2019/0353784 A1* | 11/2019 | Toledano | G01S 17/86 |
| 2019/0354111 A1 | 11/2019 | Cheng et al. | |

\* cited by examiner

METHOD FOR AUTONOMOUS NAVIGATION

CROSS-REFERENCE TO RELATED APPLICATIONS

This application claims the benefit of U.S. Provisional Application No. 62/592,791, filed on 30 Nov. 2017, which is incorporated in its entirety by this reference

TECHNICAL FIELD

This invention relates generally to the field of autonomous vehicles and more specifically to a new and useful method for autonomous navigation in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
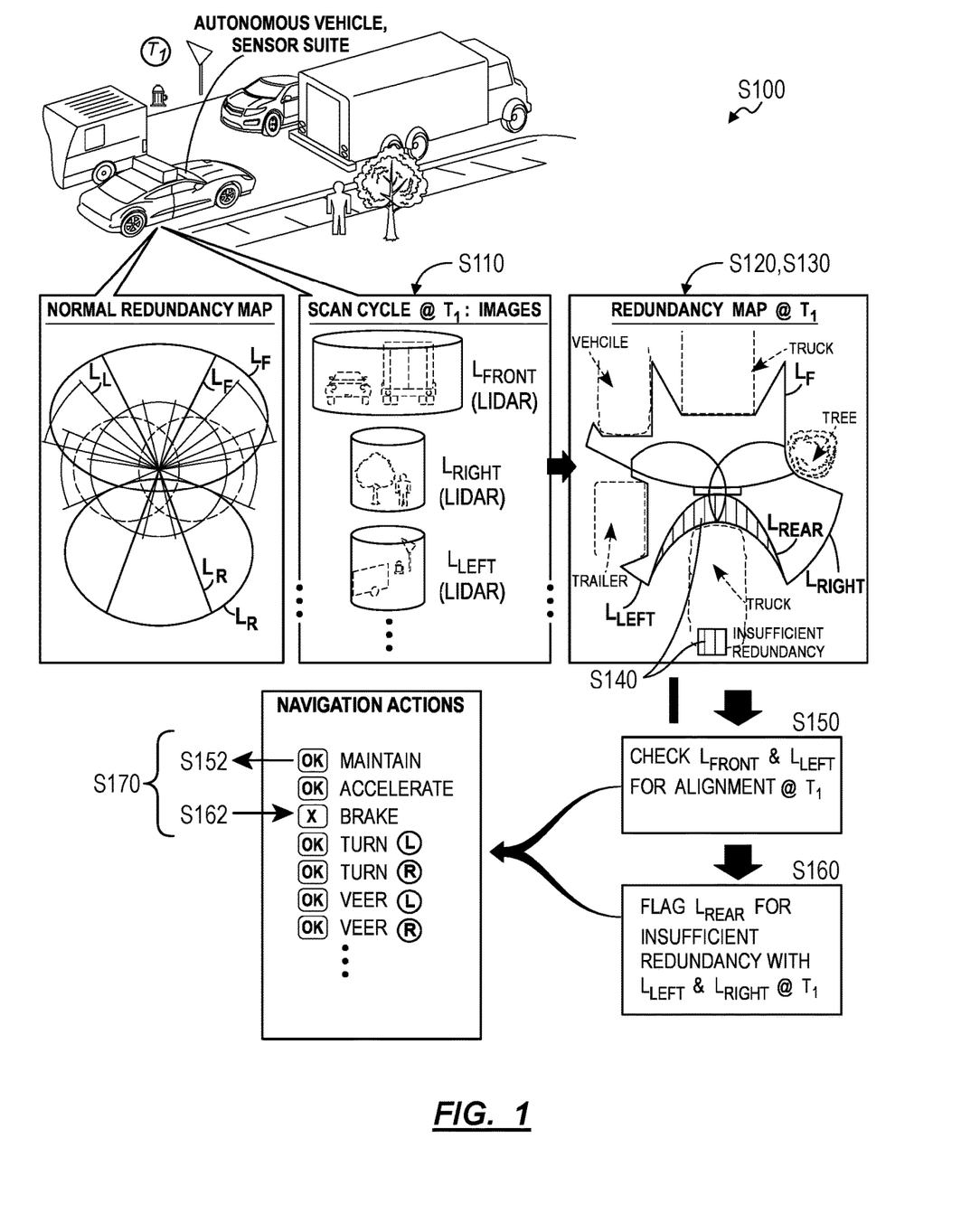
FIG. 1 is a flowchart representation of a method.
Figure 2:
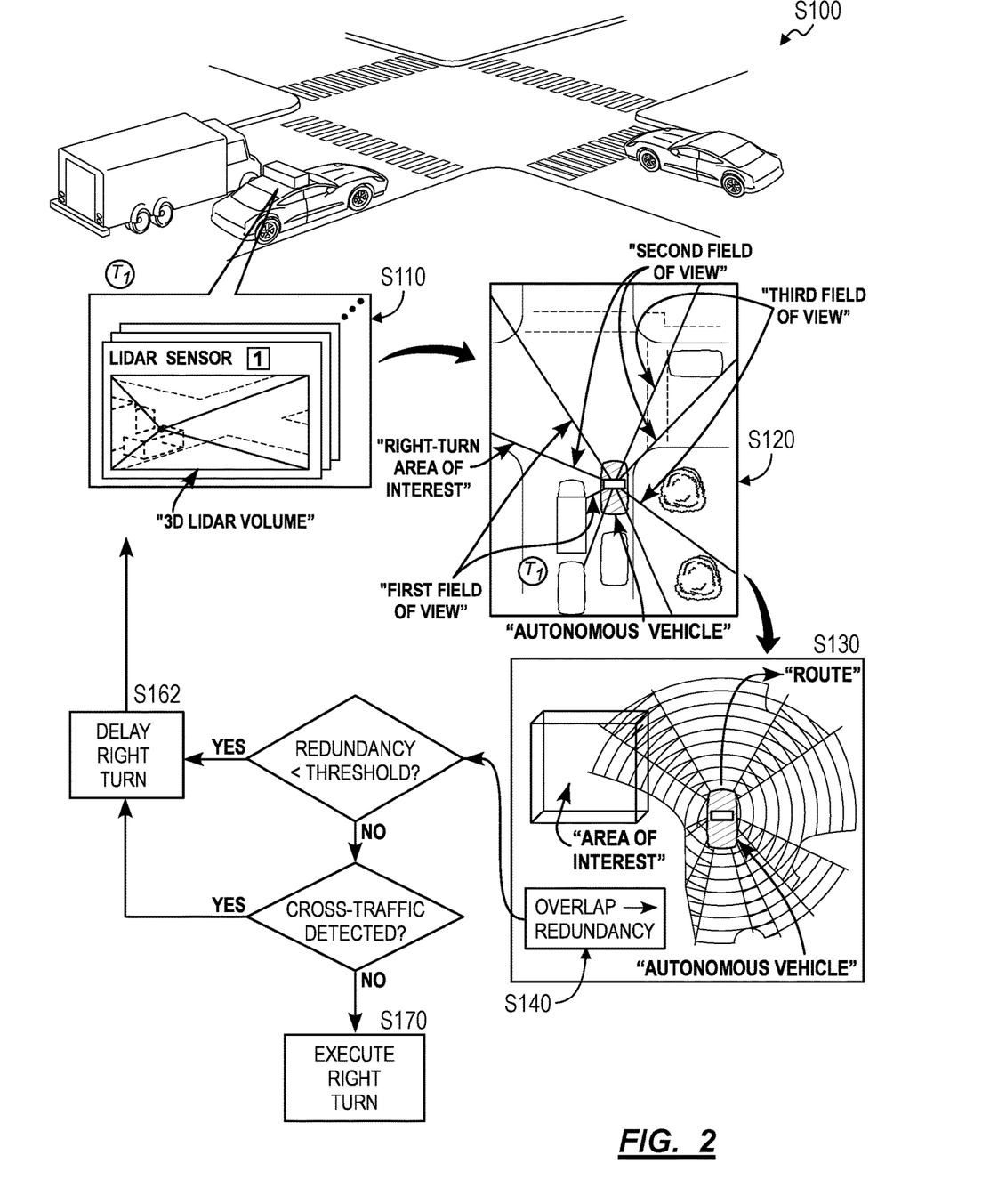
FIG. 2 is a flowchart representation of one variation of the method.

As shown in FIGS. 1 and 2, a method S100 for autonomous navigation includes, at an autonomous vehicle: recording a first image via a first sensor arranged on the autonomous vehicle and recording a second image via a second sensor arranged on the autonomous vehicle during a first scan cycle in Block S110; calculating a first field of view of the first sensor during the first scan cycle based on surfaces represented in the first image; calculating a second field of view of the second sensor during the first scan cycle based on surfaces represented in the second image in Block S120; characterizing a first spatial redundancy between the first sensor and the second sensor based on a first overlap of the first field of view and the second field of view in Block S140; in response to the first spatial redundancy remaining below a threshold redundancy, disabling execution of a first navigational action by the autonomous vehicle in Block S162, the first navigational action informed by presence of external objects within a first region of a scene around the autonomous vehicle spanning the first overlap; and autonomously executing a first set of navigational actions excluding the first navigational action over a first time period succeeding the first scan cycle in Block S170.

One variation of the method S100 shown in FIG. 3 additionally or alternatively includes: in response to the first spatial redundancy remaining below a threshold redundancy, decreasing a maximum available rate of execution of a first navigational action by the autonomous vehicle in Block S162, the first navigational action informed by presence of external objects within a first region of a scene around the autonomous vehicle spanning the first overlap; and autonomously executing a first set of navigational actions over a first time period succeeding the first scan cycle in Block S170, the first set of navigational actions comprising the first navigational action limited to the maximum available rate of execution.

Another variation of the method S100 shown in FIG. 1 includes, at an autonomous vehicle: during a scan cycle, recording multi-dimensional images via a set of sensors arranged on the autonomous vehicle in Block S110; for each sensor in the set of sensors, calculating a field of view of the sensor during the scan cycle based on external surfaces detected in a multi-dimensional image output by the sensor during the scan cycle in Block S120; compiling fields of view of the sensors in the set of sensors into an effective sensor redundancy map based on known relative positions of the set of sensors arranged on the autonomous vehicle in Block S130; and characterizing a level of redundancy between a first sensor and a second sensor in the set of sensors based on a degree of an overlap between a first field of view of the first sensor and a second field of view of the second sensor indicated by the effective sensor redundancy map in Block S140. This variation of the method S100 also includes, in response to the level of redundancy exceeding a threshold: verifying integrity of a first image recorded by the first sensor during the scan cycle and a second image recorded by the second sensor during the scan cycle based on alignment between data contained in a first region of the first image and a second region of the second image corresponding to overlapping fields of view of the first sensor and second sensor during the scan cycle in Block S150; and executing a navigational action based on external surfaces detected in the first image and the second image in Block S152. This variation of the method S100 further includes, in response to the level of redundancy remaining below the threshold: labeling the first image and the second image as unverified in Block S160; and disabling a subset of navigational actions informed by presence of external objects within a first region of a scene around the autonomous vehicle spanning the overlap between the first field of view of the first sensor and the second field of view of the second sensor in Block S162.

2. Applications

The method S100 can be executed by an autonomous road vehicle (e.g., an autonomous passenger vehicle, truck, or bus): to characterize redundancy of data recorded by LIDAR, color camera, RADAR, and/or other sensors arranged on or integrated into the autonomous vehicle, which may be affected by proximity of external objects (e.g., trucks, cars, pedestrians, road signs, trees) that obfuscate fields of view of these sensors; to verify that minimum or sufficient redundancy of data recorded by sensors with overlapping fields of view (or "sensible regions") is met; and to disable or limit certain autonomous navigational actions by the autonomous vehicle in real-time responsive to insufficient redundancy between fields of view of these sensors.

Generally, optical sensors, such as LIDAR and color camera sensors, may be arranged in particular positions and orientations on the autonomous vehicle in order to yield a certain degree of nominal redundancy (e.g., a minimum overlap in fields of view of adjacent sensors) between these sensors in a nominal condition (e.g., when the autonomous vehicle is occupying an open field without nearby obstacles). However, such nominal redundancy may not be static. Rather, overlapping regions of the fields of view of these sensors may be obstructed by nearby external objects as the autonomous vehicle navigates through a scene and/or as these external objects move toward the autonomous vehicle during their operation. Effective redundancy of these sensors on the autonomous vehicle (e.g., or actual degrees of overlap between fields of view of sensors on the autonomous vehicle) may therefore change over time—such as from sensor scan cycle to sensor scan cycle—as the autonomous vehicle autonomously navigates along a preplanned route or toward a specified destination. However, as effective redundancy between two sensors decreases, a perception system within the autonomous vehicle may be unable to spatially-align concurrent sensor data recorded by these two sensors during a scan cycle and/or spatially calibrate these two sensors to one another due to insufficient overlap in the fields that these sensor data represent. The perception system may also be unable to verify the accuracy of these sensor data (e.g., whether surfaces represented in these sensor data exist in the field, whether these surfaces are depicted in their true locations in these sensor data, and whether these sensor data depict all surfaces in the fields of view of these sensors) due to reduced or insufficient redundancy between these sensors.

Therefore, the autonomous vehicle can execute Blocks of the method S100 to characterize the effective redundancy between two sensors on the autonomous vehicle. As the effective redundancy between two sensors on the autonomous vehicle decreases, the autonomous vehicle can increase limits on autonomous navigation of actions that are affected by presence of objects in a region of the scene around the autonomous vehicle captured by these sensors. In particular, because the effective redundancy between these sensors may have decreased due to obfuscation of one object near the autonomous vehicle, the autonomous vehicle may be unable to confirm perception of other objects detected in these sensor data. The autonomous vehicle can then implement Blocks of the method S100 to limit or disable autonomous execution of navigational actions that may be informed by these other objects, such as: reducing a maximum permitted rate of braking during the next scan cycle (e.g., the next 50-millisecond time interval) responsive to insufficient redundancy between rear-facing fields of view of sensors on the autonomous vehicle; preventing a rightward lane change during the next scan cycle responsive to insufficient redundancy between right-facing fields of view of sensors on the autonomous vehicle as the autonomous vehicle traverses a multi-lane segment of road; preventing initiation of a right turn at an intersection during the next scan cycle responsive to insufficient redundancy between left-facing fields of view of sensors on the autonomous vehicle as the autonomous vehicle waits at or approaches this intersection; or preventing initiation of an unprotected left turn at an intersection during the next scan cycle responsive to insufficient redundancy between forward-, left-, and right-facing fields of view of sensors on the autonomous vehicle as the autonomous vehicle waits at or approaches this intersection. Therefore, the autonomous vehicle can execute Blocks of the method S100 to characterize the effective redundancy of sensors within its sensor suite and to selectively restrict execution of various navigational actions in real-time responsive to the effective redundancy of these sensors.

2.1 Example

For example, in a nominal condition in which no objects are within a sensible range of the sensor suite, fields of view of adjacent LIDAR sensors and/or color cameras on the autonomous vehicle may exhibit known nominal spatial overlap (e.g., redundancy in three-dimensional space). In this example, fields of view of two adjacent sensors: may not overlap at less than one meter from these sensors; may overlap by two meters in the horizontal dimension at a distance of five meters from the sensors; and may overlap by twenty meters in the horizontal dimension at a distance of forty meters from the sensors. The autonomous vehicle can thus compare features (e.g., points, surfaces, objects) detected in overlapping regions of two concurrent images output by these sensors in order to confirm that these overlapping regions depict the same constellation of surfaces. For example, the autonomous vehicle can confirm that the presence of, position of, and/or a distance to one object or surface detected in a region of a first image recorded by a first sensor sufficiently matches features of a like object or surface detected in an overlapping region of a second, concurrent image recorded by a second sensor. The autonomous vehicle can then: verify that these two sensors are functioning correctly and are properly located on the autonomous vehicle; and verify that images recorded by these sensors are sufficiently accurate. (The autonomous vehicle can similarly compare features extracted from overlapping regions of fields of view of three or more sensors on the autonomous vehicle to verify functions of these sensors and images recorded by these sensors.) However, when the autonomous vehicle approaches an external object—such as another vehicle, an overpass, a pedestrian, a traffic sign, a building, or a tree—this object may obstruct overlapping regions of fields of view of these two (or more) sensors such that less or none of these fields of view overlap, thereby reducing or eliminating redundancy of data captured by these sensors.

Therefore, the autonomous vehicle can implement Blocks of the method S100 to selectively: confirm sufficient spatial overlap in sensor data (e.g., LIDAR or color images) captured concurrently by sensors in the autonomous vehicle; verify both function of these sensors and these sensor data based on alignment between features in overlapping regions of these sensor data given sufficient spatial overlap between these sensor data; and then execute navigational actions autonomously based on objects detected—with a high degree of spatial accuracy—in these sensor data. The autonomous vehicle can also: withhold alignment verification for sensor data recorded by these sensors and instead flag these sensor data as unverified when insufficient spatial overlap between these sensor data is predicted; and then execute navigational actions autonomously based on objects detected—with a lower degree of spatial accuracy—in these sensor data.

In particular, the autonomous vehicle can implement Blocks of the method S100 to execute navigational actions—such as accelerating, braking, changing lanes, and turning—in directions faced by sensors that have been verified and based on localization and path-planning-related features extracted from verified sensor data recorded by these verified sensors. The autonomous vehicle can also implement other Blocks of the method S100 to disable other navigational actions in directions faced by sensors that the autonomous vehicle has failed to verify due to insufficient redundancy between these sensors. Thus, while regions of fields of view of two sensors on the autonomous vehicle may overlap over some distance range from the autonomous vehicle and may therefore exhibit redundancy over this range of distances in a nominal condition, the autonomous vehicle can execute Blocks of the method S100 to track real-time redundancy of multi-dimensional sensors (e.g., LIDAR and/or color camera sensors), characterize the availability and integrity of data captured by these sensors based on this redundancy, and automatically enable and disable various processes executable by the autonomous vehicle based on availability and integrity of these data.

Similarly, the autonomous vehicle can: localize and track a first object detected in verified sensor data (i.e., sensor data recorded concurrently by sensors on the autonomous vehicle, exhibiting sufficient spatial overlap, and for which alignment of like features is verified) with a high degree of confidence; and elect navigational actions to traverse a planned route and avoid collision with this first object based on a tight avoidance volume for this first object given the high confidence with which the autonomous vehicle detects and tracks this first object subject to sufficient spatial overlap in sensor data depicting this first object. However, the autonomous vehicle can also: localize and track a second set object detected in unverified sensor data (i.e., sensor data recorded concurrently by sensors on the autonomous vehicle but exhibiting insufficient spatial overlap and/or for which alignment of like features is unverified) with a lower degree of confidence; and elect navigational actions to traverse a planned route and avoid collision with this second object based on a wider avoidance volume for this second object given the lower confidence with which the autonomous vehicle detects and tracks this second object subject to lower or insufficient spatial overlap in sensor data depicting this second object. Thus, the autonomous vehicle can execute Blocks of the method S100 to track real-time redundancy of multi-dimensional sensors (e.g., LIDAR and/or color camera sensors), characterize the availability and integrity of data captured by these sensors based on this redundancy, derive confidences in locations and trajectories of objects near the autonomous vehicle based on the availability and integrity of data recorded by the autonomous vehicle and depicting this object, and automatically adjust the scope or limits of various processes executable by the autonomous vehicle based on confidences in locations and trajectories of nearby objects.

3. Autonomous Vehicle and Sensor Suite

Block S110 of the method S100 recites, during a first scan cycle recording a first image via a first sensor arranged on the autonomous vehicle and recording a second image via a second sensor arranged on the autonomous vehicle. (Block S110 can similarly recite, during a scan cycle, recording multi-dimensional sensor images at multi-dimensional sensors arranged on the vehicle.) Generally, in Block S110, an autonomous vehicle accesses sensor data from various sensors arranged on or integrated in the autonomous vehicle— such as distance scans from multiple LIDAR sensors and/or two-dimensional color images from multiple color cameras—recorded approximately concurrently by sensors defining fields of view exhibiting some overlap over a distance range from the autonomous vehicle.

In one implementation, the autonomous vehicle includes: a suite of perception sensors configured to collect information about the autonomous vehicle's environment; local memory that stores a navigation map defining lane connections and nominal vehicle paths for a road area and a localization map that the autonomous vehicle implements to determine its location in real space; and a controller that governs actuators within the autonomous vehicle to execute various functions based on the navigation map, the localization map, and outputs of these sensors. In one implementation, the autonomous vehicle includes a set of 360° LIDAR sensors arranged on the autonomous vehicle, such as one LIDAR sensor mounted at each corner of the autonomous vehicle or a set of LIDAR sensors integrated into a roof rack mounted to the roof of the autonomous vehicle. Each LIDAR sensor can output one three-dimensional distance scan—such as in the form of a three-dimensional point cloud representing distances between the LIDAR sensor and external surfaces within the field of view of the LIDAR sensor— per rotation of the LIDAR sensor (i.e., once per scan cycle). For example, each LIDAR sensor can include a stack of pixels (e.g., 16 or 32 pixels arranged in a linear vertical array) mounted on a motorized rotary table; during a scan cycle, the LIDAR sensor can rotate the rotary table and record a distance value from each pixel in the stack at each of many (e.g., 1000 or 4500) points per rotation to produce a distance scan containing a three-dimensional point cloud characterized by a relatively high azimuthal resolution (e.g., 0.3° or 0.08°) and a lower vertical resolution (e.g., 1.7° or 0.8°).

During operation, the LIDAR sensors on the autonomous vehicle can regularly output distance scans, and the controller can receive distance scans recorded approximately concurrently by these LIDAR sensors in Block S100 and then execute subsequent Blocks of the method S100 described below to calculate overlapping three-dimensional regions of these distance scans. For example, the controller can execute this process for each set of concurrent distance scans output by these LIDAR sensors. Alternatively, the controller can intermittently calculate redundancy between distance scans and intermittently activate and deactivate navigation options accordingly, such as once per second or once per 100 rotations of the LIDAR sensors. For example, once the autonomous vehicle checks the LIDAR sensors for sufficient redundancy and verifies sensor data accordingly, the autonomous vehicle can compile verified distance scans into one composite image and then compare features in this composite image to the localization map to determine the position and orientation of the autonomous vehicle in real space. From the real position and orientation of the autonomous vehicle, the controller can: calculate a nominal path between the autonomous vehicle's current location and a preplanned path toward a specified destination based on the navigation map; determine (or "perceive") a context of a scene around the autonomous vehicle from these verified distance scans; and elect an action—from a set of available navigational actions—to remain on or deviate from the nominal path based on the context of the scene around the autonomous vehicle; and manipulate actuators within the vehicle (e.g., accelerator, brake, and steering actuators) according to the elected action.

Generally, the method S100 is described below as executed by an autonomous vehicle outfitted with a set of LIDAR sensors in order to characterize and respond to changes in redundancy between the LIDAR sensors. However, the autonomous vehicle can additionally or alternatively be outfitted (or retrofitted) with other types of sensors, such as: color cameras; three-dimensional color cameras; a uni-dimensional or multi-dimensional (e.g., scanning) RADAR or infrared distance sensor; etc. The autonomous vehicle can then implement similar methods and techniques to read data from these sensors in Block S110 and to process these data in subsequent Blocks of the method S100, as described below.

For example, the autonomous vehicle can also include a RADAR sensor arranged on the front of and facing outwardly from the front of the autonomous vehicle, configured to detect surfaces in its field of view (i.e., ahead of the autonomous vehicle), and configured to output a list of these surfaces and their positions once per scan cycle. In this example, the RADAR sensor can define an approximately 2D field of view extending horizontally and outwardly from the front of the autonomous vehicle. Once per scan cycle (e.g., at a rate of 20 Hz), the RADAR sensor can output an object list for objects detected in its field of view (e.g., up to 64 objects), such as including: an azimuthal angle relative to the RADAR sensor, a distance from the RADAR sensor, and a speed relative to the RADAR sensor (i.e., relative to the autonomous vehicle more generally) for each object in the object list. In this example, the autonomous vehicle can then implement Blocks of the method S100 to derive overlapping fields of view of two RADAR sensors and characterize redundancy of these RADAR sensors accordingly In another example, the autonomous vehicle can include a LIDAR sensor and a 2D color camera defining overlapping fields of view, and the system can execute Blocks of the method S100 to characterize and respond to changes in redundancy between this LIDAR sensor and the 2D color camera.

4. Nominal Sensor Overlap Map

In one variation shown in FIG. 1, the autonomous vehicle calculates or is preloaded with a nominal sensor redundancy map that indicates overlapping fields of view of sensors on the autonomous vehicle in a nominal condition (i.e., when no external objects or surfaces are present within a maximum range of the sensors).

In one implementation, the autonomous vehicle transforms intrinsic and extrinsic properties of a sensor into a three-dimensional field of view of the sensor, such as in the form of a two-dimensional cross-section of the field of view as a function of distance from the sensor or in the form of a virtual three-dimensional volume. For example, the autonomous vehicle can calculate a conical field of view radiating outwardly from and coaxial with a camera lens of a color camera on the autonomous vehicle. In another example, the autonomous vehicle can calculate an approximately-toroidal field of view defining a triangular cross-section and coaxial with a rotational axis of a LIDAR sensor on the autonomous vehicle, wherein the triangular cross-section of the field of view terminates at a distance—from the rotational axis of the LIDAR sensor—equivalent to a maximum sensible range of the LIDAR sensors, which may be a function of local ambient light level. The autonomous vehicle can implement a similar process to characterize a three-dimensional field of view of each sensor on the autonomous vehicle.

The autonomous vehicle can then assemble these discrete sensor fields of view into a nominal sensor redundancy map for the autonomous vehicle based on known, preloaded relative positions and orientations of these sensors on the autonomous vehicle. Alternatively, the autonomous vehicle can: (re)calculate relative positions and orientations of these sensors over time based on alignment between like features represented in concurrent data recorded by the sensors during operation of the autonomous vehicle; and then leverage these (re)calibrated sensor positions to assemble fields of view of these sensors into a nominal sensor redundancy map for the autonomous vehicle. The nominal sensor redundancy map can thus depict regions of fields of view of these sensors that overlap as a function of distance from the autonomous vehicle (e.g., from a reference point on the autonomous vehicle).

5. Real-Time Sensor Field of View

Block S120 of the method S100 recites calculating a first field of view of the first sensor during the first scan cycle based on surfaces represented in the first image and calculating a second field of view of the second sensor during the first scan cycle based on surfaces represented in the second image. (Block S120 can similarly recite, for each sensor, calculating a field of view of the sensor during the scan cycle based on locations and geometries of external objects detected in a sensor image output by the sensor during the scan cycle.) Generally, in Block S120, the autonomous vehicle: detects external surfaces in the field of view of a sensor on the autonomous vehicle based on an image output by this sensor during a scan cycle; and calculates an actual three-dimensional field of view of the sensor during this scan cycle based on a nominal field of view of the sensor and characteristics (e.g., positions and geometries) of external surfaces detected in the image output by the sensor. The autonomous vehicle repeats this process for each other sensor in the suite of perception sensors on the autonomous vehicle in order to generate a set of actual three-dimensional fields of view of these sensors during the current scan cycle.

In particular, an object—such as a tree, other vehicle, building, traffic sign, traffic light, overpass, or pedestrian—falling within the field of view of a sensor on the autonomous vehicle may obstruct other objects arranged behind this object from detection by the sensor. As the position of this object changes relative to the sensor—such as when the autonomous vehicle approaches and then navigates past this object—the actual field of view of the sensor changes. In Block S120, the autonomous vehicle can therefore: detect surfaces in an image recorded by a sensor during a current scan cycle; extract positions and/or geometries of these surfaces relative to the sensor from the image; and then project positions and/or geometries of these surfaces onto the nominal field of view of the sensor to calculate an actual field of view of the sensor during the current scan cycle.

In one example, the autonomous vehicle includes a LIDAR sensor configured to output one three-dimensional point cloud per scan cycle. For a three-dimensional point cloud output by the LIDAR sensor during a current scan cycle, the autonomous vehicle can: filter the three-dimensional point cloud to remove noise; calculate a boundary of a three-dimensional volume that intersects each remaining point in the three-dimensional point cloud; crop a nominal field of view of the LIDAR sensor beyond this three-dimensional boundary; and store the resulting three-dimensional virtual volume as the field of view of the LIDAR sensor for the current scan cycle.

In a similar example, the autonomous vehicle can record a first three-dimensional LIDAR frame via a first LIDAR sensor arranged in a first position on the autonomous vehicle and record a second three-dimensional LIDAR frame via a second LIDAR sensor arranged in a second position on the autonomous vehicle during a scan cycle in Block S110. The system can then calculate a first field of view defining a first three-dimensional volume containing points within the first three-dimensional LIDAR frame and calculate a second field of view defining a second three-dimensional volume containing points within the second three-dimensional LIDAR frame in Block S120. In Block S130 described below, the autonomous vehicle can then: align the first three-dimensional volume and the second three-dimensional volume based on the known positions of the first and second LIDAR sensors on the autonomous vehicle (e.g., fixed and preloaded relative positions of first and second LIDAR sensors, or relative positions derived from calibration of the first and second LIDAR sensors during a preceding scan cycle); and characterize a spatial redundancy of the first and second LIDAR sensors during this scan cycle based on a volume of the overlap between the first three-dimensional volume and the second three-dimensional volume in Block S140. Therefore, in this example, the autonomous vehicle can: calculate a three-dimensional volume (or boundary, or "manifold") around points in the three-dimensional LIDAR image (e.g., a three-dimensional point cloud) recorded by a LIDAR sensor during a scan cycle; repeat this process for three-dimensional LIDAR images recorded by other LIDAR sensors on the autonomous vehicle during the same scan cycle; calculate a virtual three-dimensional "overlap volume" that represents spatial overlap of these three-dimensional volumes, each of which represents a three-dimensional field of view of its originating LIDAR sensor during the current scan cycle; and characterize redundancy between these sensors based on this overlap volume in Block S140.

In another example, the autonomous vehicle includes a range sensor (e.g., a two-dimensional RADAR sensor) configured to output one two-dimensional image per scan cycle, wherein each pixel in the two-dimensional image represents a distance from the sensor to a point on a surface in the field of view of the sensor. In this example, the autonomous vehicle can: filter a two-dimensional image output by the range sensor during a current scan cycle to reject noise from the two-dimensional image; calculate a three-dimensional boundary that intersects each remaining point in the three-dimensional point cloud; crop the nominal field of view of the range sensor beyond this three-dimensional boundary; and store the resulting three-dimensional virtual volume as the field of view of the range sensor for the current scan cycle.

In yet another example, the autonomous vehicle includes a three-dimensional stereo camera configured to output one three-dimensional image per scan cycle. In this example, the autonomous vehicle can: filter a three-dimensional image output by the range sensor during a current scan cycle to reject noise from the three-dimensional image; calculate a three-dimensional boundary that intersects remaining points or surfaces represented in the three-dimensional image; crop the nominal field of view of the range sensor beyond this three-dimensional boundary; and store the resulting three-dimensional virtual volume as the field of view of the three-dimensional stereo camera for the current scan cycle.

Therefore, the autonomous vehicle can extract a three-dimensional boundary of surfaces represented in any image output by a sensor on the autonomous vehicle and then crop a three-dimensional virtual representation of the nominal field of view of the sensor beyond this boundary. Alternatively, the autonomous vehicle can transform this boundary directly into a virtual three-dimensional representation of the field of view of the sensors, such as based on known intrinsic and extrinsic properties of the sensor. The autonomous vehicle can repeat this process for each multi-dimensional sensor on the autonomous vehicle in Block S120 based on sensor data collected during the current (or recent) scan cycle. However, the autonomous vehicle can implement any other method or technique to quantify an actual field of view of a sensor on the autonomous vehicle in Block S120.

6. Dynamic Effective Sensor Redundancy Map

One variation of the method S100 includes Block S130, which recites compiling fields of view of the sensors in the set of sensors into an effective sensor redundancy map based on known relative positions of the set of sensors arranged on the autonomous vehicle. In this variation, Block S140 of the method S100 recites characterizing a level of redundancy between a first sensor and a second sensor in the set of sensors based on a degree of an overlap between a first field of view of the first sensor and a second field of view of the second sensor indicated by the effective sensor redundancy map. Generally, in Block S130, the autonomous vehicle compiles current fields of view of various discrete multi-dimensional (and uni-dimensional) sensors arranged on the autonomous vehicle into an effective sensor redundancy map based on known relative positions and orientations of these sensors on the autonomous vehicle. In particular, the effective sensor redundancy map can represent three-dimensional volumes over which fields of view of discrete sensors on the autonomous vehicle are predicted to overlap during the current scan cycle. The autonomous vehicle can then characterize (e.g., quantify) redundancy between sensors in the sensor suite on the vehicle during the current scan cycle based on this effective sensor redundancy map in Block S140.

In one implementation, the autonomous vehicle implements methods and techniques described above to compile actual virtual three-dimensional (e.g., volumetric or boundary) representations of fields of view of the sensors on the autonomous vehicle during the current (or recent) scan cycle into an effective sensor redundancy map for the current scan cycle based on stored positions and orientations of these sensors on the autonomous vehicle in Block S130, as shown in FIG. 1. For example, the autonomous vehicle can: calculate intersections between three-dimensional representations of fields of view of two or more of these sensors based on predefined or previously-calculated positions of these sensors on the autonomous vehicle; extract these intersections; and store these intersections—which represent spatial overlaps of fields of view of these sensors on the autonomous vehicle during the current scan cycle—such as in an effective sensor redundancy map for the autonomous vehicle in Blocks S130 and S140. In particular, the autonomous vehicle can identify subregions in the effective sensor redundancy map for which fields of view of sensors on the autonomous vehicle overlap (i.e., for which sensor redundancy still persists) despite proximity of objects or other surfaces near the autonomous vehicle.

The autonomous vehicle can then characterize (e.g., quantify) a degree of redundancy represented by each of these spatial overlaps for the current scan cycle. For example, the autonomous vehicle can: label overlapping regions of three-dimensional representations of fields of view of two sensors as double-redundant; label overlapping regions of three-dimensional representations of fields of view of three sensors as triple-redundant; etc. The autonomous vehicle can additionally or alternatively quantify a total number of sensor image pixels, a minimum number of per-sensor pixels, a pixel density, a real volume, a dimension (e.g., width and height), etc. for each discrete double-redundant region, triple-redundant region, etc. identified in the effective sensor redundancy map and then label these discrete regions accordingly.

Therefore, in Block 140, the autonomous vehicle can identify discrete regions of fields of view of sensors that overlap the field of view of at least one other sensor on the autonomous vehicle and then quantify a degree of redundancy between these sensors, such as density or total quantity of data contained in redundant fields of view of these sensors. However, the autonomous vehicle can compile fields of view of sensors on the autonomous vehicle into a effective sensor redundancy map for the current scan cycle in Block S130 and can quantify redundancy of these fields of view in any other way and according to any other metric in Block S140.

6.1 Sensor Redundancy Feedback

In one variation, the autonomous vehicle can also present the effective sensor redundancy map to a rider inside the autonomous vehicle or to a remote operator during operation of the autonomous vehicle. For example, the autonomous vehicle can: record a first image via a first sensor arranged on the autonomous vehicle; record a second image via a second sensor arranged on the autonomous vehicle; and record a third image via a third sensor arranged on the autonomous vehicle during a scan cycle. The autonomous vehicle can then calculate: a first field of view of the first sensor during the scan cycle based on surfaces represented (e.g., detected) in the first image; a second field of view of the second sensor during the scan cycle based on surfaces represented in the second image; and a third field of view of the third sensor during the scan cycle based on surfaces represented in the third image. Furthermore, the autonomous vehicle can: characterize a first spatial redundancy between the first sensor and the second sensor based on a first overlap of the first field of view and the second field of view; and characterize a second spatial redundancy between the second sensor and the third sensor based on a second overlap of the second field of view and the third field of view in Block S140. The autonomous vehicle can then: generate an effective spatial redundancy map depicting the first spatial redundancy between the first sensor and the second sensor and depicting the second spatial redundancy between the second sensor and the third sensor during this scan cycle; and render the effective spatial redundancy map on an interior display of the autonomous vehicle during the subsequent time period (e.g., the next 50 milliseconds) and/or serve this effective spatial redundancy map to an operator portal viewed by a remote operator.

In this example, the autonomous vehicle can also overlap the effective spatial redundancy map over the nominal redundancy map in order to visually indicate a difference between the current actual and nominal redundancy of sensor data recorded during the current scan cycle—which may affect the validity or confidence in these sensor data implemented by the autonomous vehicle and how the autonomous vehicle responds to its current environment, as described below—to the occupant in the autonomous vehicle and/or to the remote operator.

However, the autonomous vehicle can visualize the effective spatial redundancy map in any other way and in any other format.

7. Sensor Error

Figure 3:
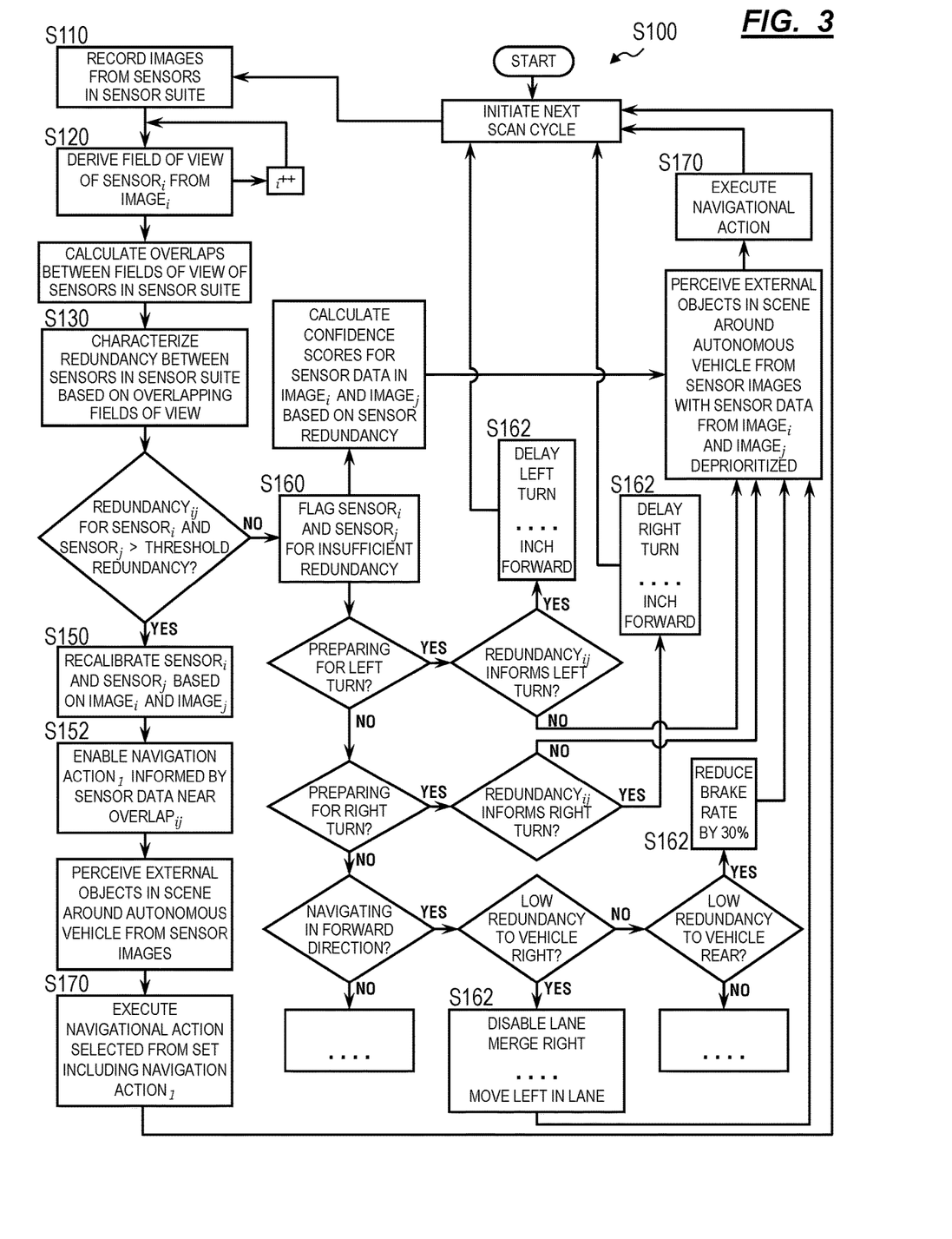
FIG. 3 is a flowchart representation of one variation of the method.

One variation of the method S100 shown in FIGS. 1 and 3 includes Block S150 and Block S152. In this variation, Block S150 recites, in response to the level of redundancy exceeding a threshold: verifying integrity of a first image recorded by the first sensor during the scan cycle and a second image recorded by the second sensor during the scan cycle based on alignment between data contained in a first region of the first image and a second region of the second image corresponding to overlapping fields of view of the first sensor and second sensor during the scan cycle; and Block S152 recites executing a navigational action based on external surfaces detected in the first image and the second image. Generally, in Block S150, the autonomous vehicle can selectively test redundant regions of images recorded by sensors on the autonomous vehicle during the current (or recent) scan cycle for data integrity based on degrees of redundancy between these sensor fields of view. In Block S152, the autonomous vehicle can then elect and execute navigational actions (e.g., accelerating, braking, veering, turning) based on features detected in these verified images, such as: a navigational action that results in acceleration of the autonomous vehicle in a direction that falls within the fields of view of these sensors that were thus verified during the current (or recent) scan cycle; and/or a navigational action that is informed by an external object (e.g., another vehicle, a pedestrian) that falls within the fields of view of these sensors that were thus verified during the current (or recent) scan cycle.

In particular, the autonomous vehicle can: test redundant regions of sensor images for alignment given sufficient redundancy between these regions; confirm integrity of (or "verify") data recorded by the corresponding sensors on the autonomous vehicle responsive to sufficient alignment (e.g., less than a maximum error) between the redundant regions in these sensor images in Block S150; and then autonomously elect and execute navigational decisions based on the verified data in Block S152. By thus identifying redundant fields of view of sensors on the autonomous vehicle and then comparing redundant regions of images output by these sensors, the autonomous vehicle can: confirm that these sensors are functioning properly and therefore likely to output reliable data; and verify that these images represent both a complete set of objects—near the autonomous vehicle—in the fields of view of these sensors and the correct locations of these objects. For example, a conflict detected between regions of two images corresponding to fields of view—of two sensors—expected to overlap may indicate that at least one of these sensors is malfunctioning or has been moved substantively from its previous position on the autonomous vehicle; the autonomous vehicle can then label data streams from both of these sensors as unreliable and discard data output by these sensors when determining its location and executing navigational decisions. However, given sufficient alignment between regions of two images corresponding to fields of view—of two sensors—expected to overlap, the autonomous vehicle can determine that both sensors are functioning properly and properly oriented on the autonomous vehicle, label data streams from both of these sensors as reliable, and execute decisions in real-time according to data output by these sensors.

In one implementation, the autonomous vehicle applies a redundancy threshold check to confirm overlapping fields of view for which sufficient data is available (or is predicted to be available) to reliably confirm integrity of data output by sensors on the autonomous vehicle. For example, the autonomous vehicle can apply a minimum threshold of 100 pixels per sensor per overlapping image region and only execute a data alignment check for overlapping fields of view of two or more sensors in Block S150 if the corresponding region in an image output by each of these sensors contains at least 100 pixels. Similarly, the autonomous vehicle can apply: a minimum threshold of 100 pixels per sensor per overlapping image region for double-redundant sensor fields of view; a minimum threshold of 70 pixels per sensor per overlapping image region for triple-redundant sensor fields of view; and a minimum threshold of 60 pixels per sensor per overlapping image region for triple-redundant sensor fields of view; etc. Alternatively, the autonomous vehicle can implement a minimum overlapping field of view volume metric, a minimal pixel density, or other metric or threshold to filter sensor alignment checks and then selectively check image data from corresponding sensors for alignment in Block S150.

The autonomous vehicle can also transform intersecting three-dimensional representations of sensor fields of view into a three-dimensional redundancy mask for each sensor; and then project each three-dimensional redundancy mask onto a sensor image output by the corresponding sensor during the current (or recent) scan cycle in order to isolate a redundant region of this image. The autonomous vehicle can then confirm that pixels (e.g., points, or lines, planes)—represented in regions of sensor images expected to overlap and for which sufficient data is expected to exist according to the effective spatial redundancy map—align. For example, the autonomous vehicle can confirm that three-dimensional boundaries represented in these overlapping regions of two (or more) sensor images approximate the same geometry or that pixels within these overlapping image regions fall on the same surfaces—within some tolerance—in the scene around the autonomous vehicle. If not, the autonomous vehicle can label data streams from one or all of these sensors as unreliable and disregard (or deemphasize) sensor data read from these sensors during the current scan cycle, such as: when localizing the autonomous vehicle; when perceiving objects in the scene around the autonomous vehicle; and when electing navigational decisions during the current and subsequent scan cycles. Furthermore, the autonomous vehicle can selectively execute an emergency stop routine or prompt a local or remote operator to assume control of the autonomous vehicle if more than a threshold number of sensors are thus labeled as unreliable for more than a threshold duration of time. However, if the autonomous vehicle confirms sufficient alignment between overlapping regions of sensor images output by two or more sensors during the current scan cycle, the autonomous vehicle can determine that these sensors are functioning properly, label data streams output by these sensors as reliable, and then rely on sensor data output by these sensors to localize the autonomous vehicle and to execute path planning decisions during the current scan cycle (and during subsequent scan cycles) in Block S152.

However, the autonomous vehicle can selectively implement sensor alignment checks in any other way in Block S150.

8. Navigation Option Filtering

Block S162 of the method S100 recites, in response to the first spatial redundancy remaining below a threshold redundancy, disabling execution of a first navigational action by the autonomous vehicle, wherein the first navigational action is informed by presence of external objects within a first region of a scene around the autonomous vehicle spanning the first overlap. (Block S160 of the method S100 can similarly recite, in response to the degree of redundancy remaining below the threshold, labeling the first sensor image and the second sensor image as unverified; and Block S162 of the method S100 can similarly recite disabling a subset of navigational actions in the direction of the fields of view of the first sensor and the second sensor.) Generally, in Block S160, the autonomous vehicle can identify sensors for which insufficient data is available to test reliability of these sensors during the current scan cycle and can flag or label these sensors accordingly. In Block S162, the autonomous vehicle can then: disable certain navigational decisions that accelerate the autonomous vehicle in directions for which reliable sensor data is not currently available; and autonomously execute other navigational actions that accelerate the autonomous vehicle in directions for which reliable sensor data is currently available, as shown in FIG. 1. Additionally or alternatively, in Block S162, the autonomous vehicle can: disable certain navigational decisions that are informed by objects in the scene around the autonomous vehicle for which reliable sensor data is not currently available; and autonomously execute other navigational actions that are informed by objects in the scene around the autonomous vehicle for which reliable sensor data is currently available.

In particular, the autonomous vehicle can selectively enable and disable navigational actions based on presence, absence, and/or degree of redundancy between fields of view of sensors on the autonomous vehicle and whether redundant data recorded by these sensors sufficiently align, as shown in FIG. 3. For example, if the fields of view of two sensors exhibit at least a minimum redundancy (e.g., at least a minimum number of overlapping pixels), the autonomous vehicle can confirm that these sensors are functioning properly in Block S150 given alignment between features extracted from overlapping regions of images recorded by these sensors, as described above. Accordingly, the autonomous vehicle can rely on these images (and images recorded by these sensors during a limited number of succeeding scan cycles) to localize itself, to perceive objects in the scene around the autonomous vehicle (e.g., with at least a minimum confidence of the spatial accuracy and completeness of this constellation of objects); and to execute path-planning decisions based on the autonomous vehicle's location and objects nearby. Therefore, by identifying redundant regions of fields of view of sensors and confirming alignment between these redundant regions in real-time, the autonomous vehicle can identify reliable sensor data from its various optical sensors. The autonomous vehicle can then: compare these reliable sensor data to a localization map to determine its location and orientation in real space; analyze these reliable sensor data to perceive a scene (e.g., objects, obstacles, conditions) around the autonomous vehicle; and then elect and execute navigational decisions to complete a preplanned route or move toward a predefined destination based on the autonomous vehicle's location and the scene nearby.

However, if two sensors are positioned on the autonomous vehicle to achieve at least a minimal redundancy in the nominal condition but presence of an object near the autonomous vehicle (or a large object more removed from the autonomous vehicle) substantially or fully obstructs redundant regions of the fields of view of these two sensors during the current scan cycle (e.g., such that less than a threshold of 100 pixels per sensor per overlapping image region exists for these two sensors), such as shown in FIGS. 1 and 2, the autonomous vehicle may be unable to reliably compare redundant regions of images output by these two sensors to check for sensor malfunction or other errors or to verify completeness of external objects detected in these images. In particular, because presence of an object near the autonomous vehicle may reduce or eliminate an overlap between the fields of view of these two sensors, the autonomous vehicle may have insufficient data to confirm alignment between data recorded by these two sensors. Because the autonomous vehicle may therefore be unable to verify the validity of these sensor data, the autonomous vehicle can discard or deprioritize sensor data recorded by these sensors: when the autonomous vehicle calculates its current location in real space based on sensor data recorded during the current scan cycle; and when electing and executing path planning decisions.

The autonomous vehicle can then selectively disable or limit certain navigational actions by the autonomous vehicle during the current scan cycle and/or for subsequent scan cycles based on fields of view of sensors that the autonomous vehicle has thus determined to be incomplete or otherwise unreliable.

8.1 Restricted Navigational Actions in the Direction of Unverified Data

In one implementation as shown in FIG. 2, the autonomous vehicle: implements methods and techniques described above to compile three-dimensional fields of view of verified sensors into a single verified field of view map based on known positions and orientations of these verified sensors on the autonomous vehicle; compresses this verified field of view map onto a horizontal plane (e.g., a ground plane); and extracts directions (e.g., angular ranges)—emanating from a reference point on the vehicle—for which verified sensor data is available during the current scan cycle. The autonomous vehicle can then filter a set of navigational actions to remove navigational actions that would accelerate the autonomous vehicle in directions outside of these angular ranges of verified sensor data. For example, if the verified field of view map indicates lack of sufficient sensor redundancy or conflicting sensor data from 256° to 281° from the forward (i.e., 0°) orientation during the current scan cycle, the autonomous vehicle can disable navigational actions that would result in leftward acceleration of the vehicle along a heading between 256° to 281°, since the autonomous vehicle may be unable to reliably determine whether the autonomous vehicle is approaching an obstacle along this heading.

In this implementation, the autonomous vehicle can also prioritize or further filter navigational actions that accelerate the vehicle along a heading opposite this range over which reliable sensor data is unavailable. In the foregoing example, the autonomous vehicle can prioritize navigational actions or restrict all available navigational actions down to navigational actions between 76° and 101° (i.e., 180° opposite the 256° to 281° range over which reliable sensor data is not available).

In one example as shown in FIG. 3, while autonomously navigating along a multi-lane road segment, the autonomous vehicle: records a first image via a first sensor arranged on the autonomous vehicle and records a second image via a second sensor arranged on the autonomous vehicle during a first scan cycle in Block S110; calculates a first field of view of the first sensor during the first scan cycle based on surfaces represented in the first image and calculates a second field of view of the second sensor during the first scan cycle based on surfaces represented in the second image in Block S120; and characterizes a spatial redundancy between the first and second sensors during the first scan cycle based on overlap of the first field of view and the second field of view that faces a right side of the autonomous vehicle. In this example, if the spatial redundancy between the first and second sensors during the first scan cycle is less than a threshold redundancy, the autonomous vehicle can: disable execution of a rightward lane change in Block 162; and then autonomously execute first set of navigational actions—exclusive of rightward lane changes—to autonomously navigate along a multi-lane road segment over a period of time following this scan cycle (e.g., the subsequent 50 milliseconds) in Block 170. More specifically, in this example, the first and second sensors can be arranged on the autonomous vehicle such that their fields of view overlap over a region extending outwardly from the right side of the autonomous vehicle; if the autonomous vehicle determines that these sensors exhibit less than a minimum redundancy in this right-facing region, the autonomous vehicle can restrict rightward navigational actions, such as by disabling a rightward lane change or reducing a maximum rate of execution of a rightward lane change during and after this scan cycle. In this example, the autonomous vehicle can additionally or alternatively prioritize a leftward motion—such as a leftward lane change if a left lane is present and unoccupied adjacent the autonomous vehicle—in order to move the autonomous vehicle further from an object that may be obscuring the first and second sensors, as described below.

In another example, the first and second sensors are arranged on the autonomous vehicle such that their fields of view overlap over a region extending outwardly from the rear of the autonomous vehicle. In this example, if the autonomous vehicle determines that these sensors exhibit less than a minimum redundancy in this right-facing region, the autonomous vehicle can reduce its maximum available braking rate in Block 162. In Block S170, the autonomous vehicle can then: continue to navigate autonomously along its planned route; and limit its braking rate to less than the maximum braking rate following this scan cycle.

8.2 Restricted Navigational Actions Linked to Locations of Unverified Data

In another implementation as shown in FIG. 3, the autonomous vehicle can disable or restrict navigational actions that are informed by (e.g., affected by) presence of external objects in a scene around the autonomous vehicle for which sensor data of insufficient redundancy is available. In particular, in this implementation, lack of redundancy between fields of view of sensors on the autonomous vehicle during a scan cycle may yield sensor data of insufficient density to confirm calibration of these sensors and/or of insufficient density to verify that these sensor data accurately represent all objects in this scene. Therefore, the autonomous vehicle can restrict or disable navigational actions that, if executed by the autonomous vehicle, may result in a collision with an external object that may be present in a region of the scene around the autonomous vehicle for which insufficient sensor redundancy is available during the current scan cycle (or during the current sequence of scan cycles).

In one example as shown in FIG. 2, while autonomously approaching or stopped at an intersection and preparing to execute a right turn into the intersection, the autonomous vehicle: records a first image via a first sensor arranged on the autonomous vehicle and records a second image via a second sensor arranged on the autonomous vehicle during a first scan cycle in Block S100; calculates a first field of view of the first sensor during the first scan cycle based on surfaces represented in the first image and calculates a second field of view of the second sensor during the first scan cycle based on surfaces represented in the second image in Block S120; and characterizes a spatial redundancy between the first and second sensors during the first scan cycle based on overlap of the first field of view and the second field of view that faces a left side of the autonomous vehicle. In this example, if the spatial redundancy between the first and second sensors during the first scan cycle is less than a threshold redundancy, the autonomous vehicle can disable execution of a right turn in Block S162 and withhold execution of a right turn into the intersection while approaching or waiting at the intersection in Block S170. In particular, if the autonomous vehicle determines that cross-traffic currently has right of way through the intersection, the autonomous vehicle can prioritize redundancy of sensor data to the left of the autonomous vehicle (e.g., specifically to the left along a cross-street currently faced by the autonomous vehicle); responsive to insufficient redundancy of sensor data to the left of the autonomous vehicle, such as due to obscuration by another vehicle (e.g., a truck) to the left of the autonomous vehicle, the autonomous vehicle can withhold execution of a right turn onto this cross street. Rather, in this example, the autonomous vehicle can: slowly navigate forward (or "inch forward") toward the intersection in order to decrease obfuscation of the scene to the left of the autonomous vehicle and thus increase redundancy of these sensor data; and then execute a right turn into the intersection once the autonomous vehicle has confirmed both sufficient sensor redundancy to the left of the autonomous vehicle and absence of another vehicle approaching the intersection from the autonomous vehicle's left.

In a similar example, a first sensor and a second sensor are arranged on the autonomous vehicle such that their fields of view overlap over a region extending outwardly from the front of the autonomous vehicle. In this example, as the autonomous vehicle approaches or is stopped at an intersection and prepares to execute a left turn into the intersection, if the spatial redundancy between the first and second sensors during a first scan cycle is less than a threshold redundancy, then the autonomous vehicle can disable execution of a left turn in Block S162 and withhold execution of a left turn into the intersection while approaching or waiting at the intersection in Block S170. In particular, if the autonomous vehicle determines that oncoming traffic currently has right of way through the intersection, the autonomous vehicle can prioritize redundancy of sensor data facing outwardly from the front of the autonomous vehicle (e.g., sensor data representing a scene ahead of the autonomous vehicle); responsive to insufficient redundancy of sensor data ahead of the autonomous vehicle, such as due to obscuration by a traffic sign arranged in the median adjacent the autonomous vehicle, the autonomous vehicle can withhold execution of a left turn into this intersection. Rather, in this example, the autonomous vehicle can: slowly navigate forward (or "inch forward") toward the intersection in order to decrease obfuscation of the scene ahead of the autonomous vehicle and thus increase redundancy of these sensor data; and then execute a left turn into the intersection once the autonomous vehicle has confirmed both sufficient sensor redundancy ahead of the autonomous vehicle and absence of an oncoming vehicle.

8.3 Path Adjustment to Increase Redundancy

Therefore, in the foregoing implementations, the autonomous vehicle can also execute a navigational action or otherwise adjust its position in order to reduce obfuscation of these sensors and increase redundancy of data captured by these sensors, as shown in FIG. 3. For example, the autonomous vehicle can: restrict or disable execution of a first navigational action if spatial redundancy of two sensors—facing a corresponding region of the scene around the autonomous vehicle—remains below the threshold redundancy, such as due to obfuscation of the fields of view of these sensors by an external object in the scene around the autonomous vehicle, as described above, in Block S162; and then autonomously execute a second navigational action—characterized by motion away from the external object—in order to distance the autonomous vehicle from the external object.

8.4 Emergency Stop

In one variation, the autonomous vehicle can implement similar methods and techniques to selectively disable certain emergency stop conditions based on real-time availability of reliable sensor data.

Generally, if certain sensor, vehicle, or traffic conditions are met, the autonomous vehicle can execute a predefined emergency stop routine that maintains the autonomous vehicle out of paths of nearby and oncoming traffic and brings the vehicle to a stop. For example, the autonomous vehicle can execute an emergency stop routine when an impact or accident involving the autonomous vehicle is detected, when less than a threshold range of angular directions of reliable sensor data is detected for more that a predefined duration of time, and/or when more than a threshold number of sensors are determined to be malfunctioning, etc. In this example, the autonomous vehicle can be preloaded with multiple emergency stop routines, such as: a right shoulder emergency stop routine in which the autonomous vehicle moves onto a right shoulder and comes to a stop; a left shoulder emergency stop routine in which the autonomous vehicle moves onto a left shoulder or into a median and comes to a stop; a rapid emergency stop routine in which the autonomous vehicle remains in its current lane and rapidly decelerates to a stop; and a slow emergency stop routine in which the autonomous vehicle remains in its current lane and slowly decelerates to a stop; etc.

In the foregoing example, if the autonomous vehicle has identified minimal or nonexistent redundancy for right-facing sensors on the vehicle for the current scan cycle and/or a contiguous number of preceding scan cycles—and that integrity of data recorded by these right-facing sensors can therefore not be verified, as described above—the autonomous vehicle can disable a right-shoulder emergency stop routine. In particular, because the autonomous vehicle may be unable to verify presence or absence of objects to its right due to low integrity of sensor data collected from right-facing sensors on the autonomous vehicle in such a scenario, the autonomous vehicle may be unable to detect and avoid an obstacle to its right which executing a right-shoulder emergency stop routine. Therefore, in this scenario, the autonomous vehicle can disable an emergency stop routine, which would otherwise move the autonomous vehicle to the right, and instead elect an alternate emergency stop routine. For example, if the autonomous vehicle has verified integrity of sensor data recorded by left-facing sensors but failed to verify sensor data recorded by right-facing sensors in the autonomous vehicle, the autonomous vehicle can execute a left shoulder emergency stop routine to navigate into the left shoulder and come to a stop while avoiding objects detected to the left of the autonomous vehicle.

If the autonomous vehicle has identified minimal or nonexistent redundancy for rear-facing sensors on the vehicle for the current scan cycle and/or a contiguous number of preceding scan cycles—and that integrity of data recorded by these rear-facing sensors can therefore not be verified, as described above—the autonomous vehicle can disable a rapid-stop emergency routine. In particular, because the autonomous vehicle may be unable to verify presence or absence of objects behind it due to low integrity of sensor data collected from rear-facing sensors on the autonomous vehicle in such a scenario, the autonomous vehicle may be unable to verify whether another vehicle is near or approaching the rear of the autonomous vehicle. Therefore, in this scenario, because rapidly stopping the vehicle may increase risk of collision between the autonomous vehicle and a vehicle near or approaching the rear of the autonomous vehicle and because the autonomous vehicle may be unable to verify presence or absence of such a vehicle, the autonomous vehicle can disable a rapid emergency stop routine and instead elect an alternate emergency routine. For example, if the autonomous vehicle has verified integrity of sensor data recorded by forward-facing and right-facing sensors but failed to verify sensor data recorded by rear-facing sensors in the autonomous vehicle, the autonomous vehicle can execute a slow right shoulder emergency stop routine to navigate into the right shoulder and slowly come to a stop while avoiding objects detected ahead of and to the right of the autonomous vehicle.

Similarly, if the autonomous vehicle has identified minimal or nonexistent redundancy for forward-facing sensors on the vehicle for the current scan cycle and/or a contiguous number of preceding scan cycles—and that integrity of data recorded by these forward-facing sensors can therefore not be verified, as described above—the autonomous vehicle can disable a slow forward stop emergency routine. In particular, because the autonomous vehicle may be unable to verify presence or absence of objects ahead due to low integrity of sensor data collected from forward-facing sensors on the autonomous vehicle in such a scenario, the autonomous vehicle may be unable to verify whether the autonomous vehicle is approaching another vehicle (or pedestrian, cyclist). Therefore, in this scenario, because continuing along a forward trajectory and slowly approaching a stop may increase risk of collision with another object ahead and because the autonomous vehicle may be unable to verify presence or absence of objects in its forward path, the autonomous vehicle can disable a slow emergency stop routine and instead elect an alternate emergency routine. For example, if the autonomous vehicle has verified integrity of sensor data recorded by rear-facing and right-facing sensors but failed to verify sensor data recorded by forward-facing sensors in the autonomous vehicle, the autonomous vehicle can execute a rapid stop emergency routine to quickly stop the autonomous vehicle along its current path if an obstacle is detected to the right of the autonomous vehicle but no object (e.g., other vehicle) is detected behind the autonomous vehicle (e.g., within a threshold distance of the rear of the autonomous vehicle proportional to a current speed of the autonomous vehicle). Alternatively, the autonomous vehicle can execute a rapid right shoulder emergency routine to rapidly move into the right shoulder and then rapidly come to a stop if no obstacle is detected to the right of the autonomous vehicle but another vehicle is detected behind the autonomous vehicle.

However, the autonomous vehicle can implement any other methods or techniques to selectively disable certain navigational actions and/or emergency stop routines based on availability of reliable sensor data in Block S162.

8.5 Spatial Redundancy Between Multiple Sensor Groups

The autonomous vehicle can implement similar methods and techniques to characterize overlap and spatial redundancy between a larger set of sensors on the autonomous vehicle during a scan cycle. For example, the autonomous vehicle can include: a first sensor defining a first field of view; a second sensor defining a second field of view that intersects the first field of view in a nominal condition; and a third sensor defining a third field of view that intersects the second field of view but not the first field of view in a nominal condition. During a scan cycle, the autonomous vehicle can thus: characterize a first spatial redundancy between the first sensor and the second sensor based on a first overlap of the first field of view and the second field of view; and characterize a second spatial redundancy between the second sensor and the third sensor based on a second overlap of the second field of view and the third field of view in Block S140, such as described above. Then, if the first spatial redundancy is less than a threshold redundancy but the second spatial redundancy is greater than the threshold redundancy, the autonomous vehicle can: disable execution of a first navigational action that is informed by presence of external objects within a first region of the scene around the autonomous vehicle spanning the first overlap; and enable execution of a second navigational action informed by presence of external objects within a second region of the scene spanning the second overlap in Block S162. The autonomous vehicle can then select from a list of available navigational actions—excluding the first navigational action and including the second navigational action—during a subsequent period of time (e.g., until the next scan cycle) while autonomously executing a planned route in Block S170.

8.6 Sensor Data Confidence Scores

In the foregoing implementation, the autonomous vehicle can also calculate a first confidence for sensor data contained in a first segment of the first image and a second segment of the second image—spanning the first overlap—based on a magnitude of this first overlap; calculate a second confidence for sensor data contained in a third segment of the third image and a fourth segment of the second image—spanning the second overlap—based on a magnitude of the second overlap. In this implementation, if the magnitude of the second overlap exceeds the magnitude of the first overlap, the autonomous vehicle can derive a second confidence that exceeds the first confidence. Similarly, if the density of sensor data contained in the second overlap exceeds the density of sensor data contained in the first overlap, the autonomous vehicle can derive a second confidence that exceeds the first confidence. Accordingly, the autonomous vehicle can calculate a third confidence for sensor data in a fifth region of the second image between the second segment and the fourth segment of the second image, wherein the third confidence is greater than the first confidence and less than the second confidence. The autonomous vehicle can: disable a first navigational action—informed by sensor data in and around the first overlap of the first and second images—if the first confidence is less than a minimum threshold; enable a second navigational action—informed by sensor data in and around the fifth region of the second image—at a reduced rate if the third confidence score exceeds the minimum threshold but is less than the target threshold; and enable an unrestricted third navigational action—informed by sensor data in and around the second overlap of the second and third images—if the second confidence score exceeds the target threshold.

Therefore, in this implementation, the autonomous vehicle can: calculate confidence scores for integrity of sensor data recorded by sensors on the autonomous vehicle based on redundancy of these data; and then selectively disable or restrict navigational actions informed by these sensor data based on these confidence scores.

8.7 Sensor Data Inclusion/Exclusion

Additionally or alternatively, in the foregoing implementation, in response to the first spatial redundancy between the first and second sensors remaining below a threshold redundancy during the current scan cycle, the autonomous vehicle can label a first segment of the first image—proximal the first overlap between the fields of view of the first and second sensors—and a second segment of the second image—also proximal this first overlap—as unverified in Block S160. Furthermore, in response to the second spatial redundancy between the second and third sensors exceeding the threshold redundancy during the current scan cycle, the autonomous vehicle can: verify integrity of a third segment of the third image—proximal the second overlap between the fields of view of the second and third sensors—and a fourth segment of the fourth image—also proximal this second overlap—in Block S150. Accordingly, the autonomous vehicle can autonomously execute a set of navigational actions over a subsequent period of time based on sensor data—excluding the first segment of the first image, excluding the second segment of the second image, including the third segment of the third image, and including the fourth segment of the fourth image—recorded during the current scan cycle in Block S170.

9. Subsequent Scan Cycles

The autonomous vehicle can execute the foregoing process regularly throughout operation, such as once per scan cycle, once per ten scan cycles, once per second, etc. in order to quantify redundancy and reliability of sensor data and to filter or weight a set of navigational actions accordingly.

For example, after executing a first scan cycle and restricting or disabling a navigational action due to insufficient redundancy between fields of view of two LIDAR sensors on the autonomous vehicle, the autonomous vehicle can: record a third three-dimensional LIDAR frame via the first LIDAR sensor and record a fourth three-dimensional LIDAR frame via the second LIDAR sensor during a second scan cycle succeeding the first scan cycle in Block S110; define a third three-dimensional volume containing points within the third three-dimensional LIDAR frame and define a fourth three-dimensional volume containing points within the fourth three-dimensional LIDAR frame in Block S120; align the third three-dimensional volume and the fourth three-dimensional volume based on the known or previously-calibrated first position of the first LIDAR sensor and second position of the second LIDAR sensor on the autonomous vehicle; and characterizing a second spatial redundancy between the first LIDAR sensor and the second LIDAR sensor based on a second overlap volume of a second overlap between the third three-dimensional volume and the fourth three-dimensional volume in Block S140. Then, in response to the second spatial redundancy exceeding the threshold redundancy, the autonomous vehicle can: enable execution of a first navigational action—informed by external objects in a scene depicted in or near this second overlap volume of the fields of view of the first and second LIDAR sensors—in Block S152; and execute a calibration routine to recalculate the second position of the second LIDAR sensor relative to the first position of the first LIDAR sensor on the autonomous vehicle, such as based on alignment between points contained in the second overlap. (Alternatively, in response to the second spatial redundancy exceeding the threshold redundancy, the autonomous vehicle can reduce restrictions on execution of the first navigational action, such as by increasing the maximum available rate of execution of the first navigational action, by the autonomous vehicle in Block S152.)

The autonomous vehicle can then autonomously execute a second set of navigational actions—including the first navigational action (which may be limited by dynamics of the autonomous vehicle and verified external objects detected by the autonomous vehicle rather than restricted internally according to perception-based limits described above)—over a second time period (e.g., a 50-millisecond interval) succeeding the second scan cycle.

10. Map of Immutable Obfuscating Objects

In one variation, the autonomous vehicle constructs a record of geospatial locations and orientations in which the autonomous vehicle experiences periods of insufficient sensor redundancy. For example, as the autonomous vehicle traverses various routes over time, the autonomous vehicle can: store geospatial positions and orientations in which the autonomous vehicle detects low or insufficient redundancy; and return these geospatial locations and orientations to a remote computer system. The remote computer system can then: aggregate geospatial locations and orientations associated with reduced sensor redundancy across a fleet of autonomous vehicles deployed in a geographic region; isolate a subset of geospatial locations and orientations in which low or insufficient redundancy occurs at greatest frequency across the fleet of autonomous vehicles; update a localization map for the geographic region with sensor-redundancy flags in this subset of geospatial locations and orientations; and push this updated localization map to autonomous vehicles in this fleet. These autonomous vehicles can then leverage this updated localization map to preemptively reduce their speeds or change lanes when approaching a geospatial location and orientation associated with low or insufficient redundancy in order to maintain greater sensor redundancy when navigating through this geospatial location.

In one example, while executing a planned route, the autonomous vehicle: executes a sequence of scan cycles; characterizes redundancy between a first sensor and a second sensor on the autonomous vehicle, as described above; tracks the geospatial location of the autonomous vehicle; estimates a geospatial location of an external object that caused reduced redundancy between the first and second sensors (e.g., by obfuscating the fields of view of the first and second sensors) based on the geospatial location of the autonomous vehicle and a representation of this external object in image data recorded by the first and second sensors; flags the geospatial location of the external object; and navigates past the external object at a first speed. Later, when the autonomous vehicle is called to execute this same route, the autonomous vehicle (or the remote computer system) can autonomously navigate past the stored geospatial location of this external object at a second speed less than the first speed responsive to a prediction of reduced spatial redundancy of these sensors, as occurred during the previous execution of this route by the autonomous vehicle.

Alternatively, the remote computer system can annotate a navigation map with geospatial locations and orientations in which low or insufficient redundancy conditions occur with greatest frequency throughout the fleet. The remote computer system or an autonomous vehicle in the fleet can then calculate a route—between a start location and destination location—that avoids these flagged geospatial locations and orientations in order to enable the autonomous vehicle to achieve greater sensor redundancy when autonomously navigating from the start location to the destination location.

In one example, while executing a planned route, the autonomous vehicle: executes a sequence of scan cycles; characterizes redundancy between a first sensor and a second sensor on the autonomous vehicle, as described above; tracks the geospatial location of the autonomous vehicle; estimates a geospatial location of an external object that caused reduced redundancy between the first and second sensors (e.g., by obfuscating the fields of view of the first and second sensors) based on the geospatial location of the autonomous vehicle and a representation of this external object in image data recorded by the first and second sensors; flags the geospatial location of the external object; and navigates past the external object, including maintaining a first distance from the geospatial location of the external object. Later, when the autonomous vehicle is called to execute this same route, the autonomous vehicle (or the remote computer system) can revise the route such that, when the route is executed by the autonomous vehicle, the autonomous vehicle passes the external object at a greater distance from the stored geospatial location of the external object.

In the foregoing implementations, the autonomous vehicle and/or the remote computer system can implement similar methods and techniques to modify a route or to modify path planning of the autonomous vehicle based on sensor redundancy data recorded by other autonomous vehicles in the fleet.

The autonomous vehicle, the fleet of autonomous vehicles, and/or the remote computer system can implement similar methods and techniques to construct a map or other container depicting degrees of redundancy or sensor data confidence scores along routes in a geographic region traversed by autonomous vehicles in this fleet. The remote computer system or an autonomous vehicle can then leverage this map or other container to calculate routes—between start locations and destination locations—that are predicted to yield greater sensor redundancy or sensor data confidence when executed by the autonomous vehicle. For example, the remote computer system or the autonomous vehicle can leverage this map or container of historical sensor redundancy and sensor data confidences to calculate a route that balances: shortest path; least traffic, shortest travel time; lowest likelihood of disengagement; greatest sensor redundancy; and/or greatest sensor data confidence.

In one variation, the remote computer system or a fleet manager associated with the fleet of autonomous vehicles can also: leverage these sensor redundancy data recorded by the fleet of autonomous vehicles while navigating within a geographic region to identify a sensor configuration on these vehicles that may be the cause of high frequency of low or insufficient sensor redundancy episodes across the fleet; and then specify modification of sensor suites on these autonomous vehicles in order to reduce low or insufficient sensor redundancy episodes at these autonomous vehicles, such as change in position of a sensor or addition of a sensor on each autonomous vehicle in the fleet. For example, the remote computer system can aggregate both low or insufficient sensor redundancy episodes and indicate specific sensors that exhibit low or insufficient sensor redundancy in each of these episodes across the fleet of autonomous vehicles over a period of time into a histogram of sensor pairs—in standard sensor suites on these autonomous vehicles—that exhibited low or insufficient sensor redundancy. The fleet manager can then specify a change in position of a particular sensor or addition of a sensor in the standardized sensor suites deployed to each autonomous vehicle in the fleet based on this histogram.

However, an autonomous vehicle, the remote computer system, and/or a fleet manager can leverage low or insufficient sensor redundancy episodes occurring across autonomous vehicles in the fleet in any other way to modify future routes of these autonomous vehicles, path planning by these autonomous vehicles, or sensor suites deployed on these autonomous vehicles.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for autonomous navigation comprising:
   obtaining a first image, the first image captured using a first sensor of an autonomous vehicle;
   obtaining a second image, the second image captured using a second sensor of the autonomous vehicle;
   determining a first field of view of the first sensor based on the first image;
   calculating determining a second field of view of the second sensor based on the second image;
   characterizing a spatial redundancy between the first sensor and the second sensor based on an overlap of the first field of view and the second field of view;
   modifying an execution of a first navigational action of a set of one or more navigational actions by the autonomous vehicle based on the spatial redundancy remaining below a threshold redundancy and the navigational action being informed by a presence of one or more external objects within a region of a scene around the autonomous vehicle corresponding to the overlap of the first field of view and the second field of view; and
   autonomously navigating the autonomous vehicle based on the set of one or more navigational actions.
2. The method of claim 1, wherein the first field of view and the second field of view are on a side of the autonomous vehicle, the navigational action by the autonomous vehicle comprising a lane change by the autonomous vehicle.
3. The method of claim 1, wherein modifying the execution of the navigational action includes deterring movement into an intersection during a time period.
4. The method of claim 1, wherein the spatial redundancy remains below the threshold redundancy due to obfuscation of one or more of the first field of view of the first sensor and the second field of view of the second sensor in the scene around the autonomous vehicle.
5. The method of claim 1, wherein:
   modifying the execution of the navigational action includes excluding the navigational action from the set of one or more navigational actions over a time period.
6. The method of claim 1, further comprising:
   calculating a confidence for sensor data contained in a first segment of the first image and a second segment of the second image based on the overlap, the one or more navigational actions determined based on the confidence for the sensor data.
7. The method of claim 1, wherein determining the first field of view of the first sensor comprises defining a first three-dimensional volume and determining the second field of view of the second sensor comprises defining a second three-dimensional volume, and wherein characterizing the spatial redundancy between the first sensor and the second sensor comprises:
   aligning the first three-dimensional volume and the second three-dimensional volume based on a first position of the first sensor and a second position of the second sensor; and
   characterizing an overlap volume between the first three-dimensional volume and the second three-dimensional volume, the overlap volume corresponding to the overlap of the first field of view and the second field of view.

8. The method of claim 1, further comprising:
characterizing a second spatial redundancy between the first sensor and the second sensor based on a second overlap, the second overlap corresponding to a third image captured using the first sensor and a fourth image captured using the second sensor; and
recalculating a position of the second sensor relative to the first sensor based on the second overlap.

9. The method of claim 1, further comprising:
generating a redundancy map including the spatial redundancy between the first sensor and the second sensor.

10. A system for autonomous navigation comprising:
a first sensor of an autonomous vehicle, the first sensor capturing a first image, a first field of view of the first sensor being determined based on the first image;
a second sensor of the autonomous vehicle, the second sensor capturing a second image, a second field of view of the second sensor being determined based on the second image;
a perception system characterizing a spatial redundancy between the first sensor and the second sensor based on an overlap of the first field of view and the second field of view, an execution of a navigational action of a set of one or more navigational actions by the autonomous vehicle being modified based on the spatial redundancy remaining below a threshold redundancy and the navigational action being informed by presence of one or more external objects within a region of a scene around the autonomous vehicle corresponding to the overlap of the first field of view and the second field of view.

11. One or more tangible non-transitory computer-readable storage media storing computer-executable instructions for performing a computer process on a computing system, the computer process comprising:
obtaining one or more multi-dimensional images, the one or more multi-dimensional images captured using a set of sensors of an autonomous vehicle;
calculating a set of one or more fields of view of the set of sensors based on one or more external surfaces detected in the one or more multi-dimensional images;
compiling the one or more fields of view of the set of sensors into a sensor redundancy map based on known relative positions of the set of sensors of the autonomous vehicle;
characterizing a level of redundancy between a first sensor and a second sensor in the set of sensors based on an overlap between a first field of view of the first sensor and a second field of view of the second sensor indicated by the sensor redundancy map;
comparing the level of redundancy between the first sensor and the second sensor to a redundancy threshold;
determining whether to execute a navigational action of a set of one or more navigational actions based on the comparing of the level of redundancy to the redundancy threshold, the navigational action informed by a presence of one or more external objects within a region of a scene around the autonomous vehicle corresponding to the overlap of the first field of view and the second field of view; and
autonomously navigating the autonomous vehicle based on the set of one or more navigational actions.

12. The system of claim 10, wherein the navigational action includes at least one of a lane change, a turn, or moving through an intersection.

13. The system of claim 10, wherein the execution of the navigational action is modified by at least one of: excluding the navigational action from the set of navigational actions during a time period; delaying the execution of the navigational action; or changing the navigational action.

14. The system of claim 10, wherein the execution of the navigational action is modified by decreasing a rate at which the navigational action is executed.

15. The system of claim 10, wherein the first sensor is a first LIDAR sensor and the second sensor is a second LIDAR sensor, the first field of view comprising a first three-dimensional LIDAR frame and the second field of view comprising a second three-dimensional LIDAR frame, the spatial redundancy characterized based on an alignment of the first three-dimensional LIDAR frame with the second three-dimensional LIDAR frame.

16. The system of claim 10, wherein a position of the second sensor relative to the first sensor is optimized based on the spatial redundancy.

17. The one or more tangible non-transitory computer-readable storage media of claim 11, wherein the navigational action is executed when the level of redundancy exceeds the relevancy threshold.

18. The one or more tangible non-transitory computer-readable storage media of claim 11, wherein the navigational action is modified when the level of redundancy is below the relevancy threshold.

19. The one or more tangible non-transitory computer-readable storage media of claim 18, wherein modification of the navigational action includes excluding the navigational action from the set of one or more navigational actions.

20. The one or more tangible non-transitory computer-readable storage media of claim 18, wherein modification of the navigational action includes decreasing a rate at which the navigational action is executed.

* * * * *